United States Patent
Hofmann et al.

(10) Patent No.: US 12,316,242 B2
(45) Date of Patent: May 27, 2025

(54) SUBMODULE AS A HYBRID CELL FOR A MODULAR MULTILEVEL CONVERTER

(71) Applicant: Innomotics GmbH, Nuremberg (DE)

(72) Inventors: Viktor Hofmann, Bayreuth (DE); Mark-Matthias Bakran, Erlangen (DE); Sebastian Semmler, Nuremberg (DE)

(73) Assignee: Innomotics GmbH, Nuremberg (DE)

(*) Notice: Subject to any disclaimer, the term of this patent is extended or adjusted under 35 U.S.C. 154(b) by 241 days.

(21) Appl. No.: 17/928,124

(22) PCT Filed: Apr. 30, 2021

(86) PCT No.: PCT/EP2021/061414
§ 371 (c)(1),
(2) Date: Nov. 28, 2022

(87) PCT Pub. No.: WO2021/239387
PCT Pub. Date: Dec. 2, 2021

(65) Prior Publication Data
US 2023/0208315 A1    Jun. 29, 2023

(30) Foreign Application Priority Data
May 29, 2020  (EP) .................................. 20177497

(51) Int. Cl.
*H02M 7/483*  (2007.01)
(52) U.S. Cl.
CPC ......... *H02M 7/4835* (2021.05); *H02M 7/483* (2013.01)

(58) Field of Classification Search
CPC ....................................................... H02M 7/49
See application file for complete search history.

(56) References Cited

U.S. PATENT DOCUMENTS

| | | | |
|---|---|---|---|
| 9,929,634 B2* | 3/2018 | Nami | H02M 7/4835 |
| 2004/0032757 A1* | 2/2004 | Gateau | H02M 7/483 363/132 |
| 2007/0025126 A1* | 2/2007 | Barbosa | H02M 7/4837 363/60 |

(Continued)

FOREIGN PATENT DOCUMENTS

| | | |
|---|---|---|
| CN | 104410260 A | 3/2015 |
| CN | 105677012 A | 5/2016 |
| CN | 110829872 A | 2/2020 |

(Continued)

OTHER PUBLICATIONS

Samadaei et al., A Square T-Type (ST-Type) Module for Asymmetrical Multilevel Inverters, 2018, IEEE, vol. 33 No. 2 pp. 987-996 (Year: 2018).*

(Continued)

*Primary Examiner* — Gustavo A Rosario-Benitez
(74) *Attorney, Agent, or Firm* — Henry M. Feiereisen LLC

(57) ABSTRACT

A submodule for a modular multilevel converter has ten semiconductor switches that can be switched off, four capacitors, six network nodes, and two terminals. The components are mounted such that different voltages are generated between the terminals of the submodule by controlling the semiconductor switches. This arrangement of components substantially improves the behavior of the converter and of the submodule in the event of a fault.

7 Claims, 3 Drawing Sheets

(56) References Cited

U.S. PATENT DOCUMENTS

2016/0226480 A1\* 8/2016 Marquardt ............... H02J 3/36
2023/0053066 A1\* 2/2023 Huang ................. H02M 7/487

FOREIGN PATENT DOCUMENTS

DE        101 03 031 A1    7/2002
WO    WO 2019149367 A1    8/2019

OTHER PUBLICATIONS

Vazquez, Sergio et al.; "A Generalized Predictive control for T-type power inverters with output LC filter", 2015 9th International Conference on Compatibility and Power Electronics (CPE), IEEE, XP033214295, Jun. 24, 2015 (Jun. 24, 2015), pp. 20-24, DOI: 10.1109/CPE.2015.7231043.
PCT International Search Report and Written Opinion of International Searching Authority mailed Jun. 29, 2021 corresponding to PCT International Application No. PCT/EP2021/061414 filed Apr. 30, 2021.

\* cited by examiner

FIG 3

| No | S1/S2 | S3 | S4/S5 | S6/S7 | S8 | S9/S10 | $U_{SM}$ |
|---|---|---|---|---|---|---|---|
| 1 | 1 | 0 | 0 | 1 | 1 | 0 | $U_{C1} + U_{C2}$ |
| 2 | 1 | 0 | 0 | 1 | 0 | 1 | $U_{C1}$ |
| 3 | 0 | 1 | 0 | 1 | 1 | 0 | $U_{C2}$ |
| 4 | 0 | 1 | 0 | 1 | 0 | 1 | 0 |
| 5 | 1 | 0 | 1 | 0 | 0 | 1 | 0 |
| 6 | 0 | 1 | 1 | 0 | 0 | 1 | $-U_{C1}$ |
| Block | 0 | 0 | 0 | 0 | 0 | 0 | $U_{C1} + U_{C2}$ $-U_{C1}$ |

SUBMODULE AS A HYBRID CELL FOR A MODULAR MULTILEVEL CONVERTER

CROSS-REFERENCES TO RELATED APPLICATIONS

This application is the U.S. National Stage of International Application No. PCT/EP2021/061414, filed Apr. 30, 2021, which designated the United States and has been published as International Publication No. WO 2021/239387 A1 and which claims the priority of European Patent Application, Serial No. 20177497.3, filed May 29, 2020, pursuant to 35 U.S.C. 119 (a)-(d).

BACKGROUND OF THE INVENTION

The invention relates to a submodule for a modular multilevel converter. The invention further relates to a modular multilevel converter. Furthermore, the invention relates to a method for operating and a method for manufacturing a submodule of this type.

A modular multilevel converter is known from DE 101 03 031 A1. This is also referred to as MMC or M2C. This type of converter has a plurality of submodules, with which a stepped output voltage can be generated.

The modular multilevel converter is a converter topology that is in particular suited for HVDC applications and electric drives. The basic structure of the multiphase converter comprises two converter arms per phase, which in each case are embodied as a serial connection of numerous submodules. Thanks to the modular structure a desired voltage waveform is emulated on a quantized basis by each converter arm, in that with each submodule either a discrete voltage or a terminal short-circuit is modulated. The submodules in this case enable different voltages levels to be set.

Various submodule variants exist. The most commonly known submodules at present are half and full bridges.

The submodules in this case contain semiconductor switches that can be switched off, such as for example IGBTs, IGCTs, GTOs, MOSFETs, etc. In contrast to thyristors, not only can these switch a current on, but can also switch it off. The current can only be switched off in one direction of current flow (Forward direction), In the opposite direction (Reverse direction) of current flow the semiconductor switches that can be switched off behave like a diode. Either this behavior is already a given thanks to the structure of the converter or it is achieved by means of a diode arranged antiparallel to the switching element of the semiconductor switch. Thus a semiconductor switch that can be switched off can switch and switch off a current in one direction of current flow and in the other direction of current flow can only conduct it. A current in this other direction of current flow cannot therefore be switched off.

The object of the invention is to improve the submodule of a modular multilevel converter.

SUMMARY OF THE INVENTION

This object is achieved by a submodule as set forth hereinafter. Furthermore, this object is achieved by a modular multilevel converter as set forth hereinafter. The object Is further achieved by a method for operating a submodule as set forth hereinafter and by a method for manufacturing a submodule as set forth hereinafter.

Advantageous embodiments of the invention are specified in the dependent claims.

The invention is based on, among other things, the finding that thanks to the proposed arrangement of the semiconductor switches and of the capacitors the malfunctioning of the submodule and of the modular multilevel converter can be improved. Six switching states of the semiconductor switches can be defined and thus generate five different output voltages at the terminals of the submodule. In addition, a further switching state can be achieved, in which however different voltages are present at the terminals as a function of the direction of current flow through the submodule. Thus in particular the six switching states mentioned first are particularly advantageous for the regulation and control of the submodules and of the modular multilevel converter.

The circuit is employed as a submodule in a modular multilevel converter. In this case six switching states relevant for regular operation can be actively switched with the submodule, and result in different output voltages between both the terminals of the submodule. The first and the second capacitor as well as the third and the fourth capacitor are in this case always in each case connected in parallel. For greater clarity, the modulated voltage of the parallel connection composed of a first and a second capacitor is referred to below as $U_{C1}$ and the modulated voltage of the parallel connection composed of a third and fourth capacitor is referred to as $U_{C2}$. The following voltage states can be switched between the terminals of the submodule:

a positive serial connection of both capacitor parallel connections, corresponding to the sum of $U_{C1}$ and $U_{C2}$,
in each case a simple capacitor parallel connection, corresponding to $U_{C1}$ or $U_{C2}$,
no voltage (terminal short-circuit or freewheel) and
negative capacitor parallel connection, corresponding to $-U_{C1}$.

These states can all be switched independently of the direction of the current, in other words bidirectionally.

The inventive submodule can be compared functionally with the serial connection of a half and full bridge. In this case the same voltage states can be switched between the terminals of the subrnodule. If the individual semiconductor switches are correspondingly dimensioned in the proposed arrangement and in a serial connection composed of a half and full bridge, this also results in the same number of semiconductors. If it is assumed that in the proposed arrangement and in the serial connection composed of a half and full bridge the same capacitor energy is installed, the discharge energy is only half as great in the inventive arrangement in the event of a semiconductor fault. If a semiconductor switch fails here, only one of the capacitors switched in parallel is ever short-circuited. Thus it is also the case that only half the energy has to be safely controlled in the submodule or converter.

This behavior in the event of a fault can likewise be achieved if in the case of the serial connection of the half and full bridge both submodules are in each case embodied as a parallel connection. However, in this case at least twelve switches must be installed compared to the ten in the inventive arrangement. Thus the aim of less fault energy, in other words energy in the event of a fault, can be achieved with a substantially smaller number of semiconductors and semiconductor controls. This makes the submodule and thus the modular multilevel converter substantially less complex, more cost-effective and easier to control and/or regulate.

In the basic structure the submodule can be composed of two part-modules, since the submodule is mirror-symmetrical. It is thus particularly advantageous to construct the submodule simply and cost-effectively out of two part-modules. The part-modules in this case comprise the terminals, the first, third, fourth, sixth, eighth and ninth semiconductor switches, the first and the third capacitor and the first, third, fourth and the sixth network nodes.

The third and the eighth semiconductor switches are then formed by a parallel connection formed in each case of a semiconductor switch of both the part-modules, so that these can then be dimensioned to be smaller, for example with half the current-carrying capacity.

In the proposed structure the third semiconductor switch and the eighth semiconductor switch should each be dimensioned for the full current-carrying capacity of the submodule 1. The other semiconductor switches should in each case be designed for only half the current-carrying capacity. Since in an implementation using two part-modules the third semiconductor switch and the eighth semiconductor switch occur as a parallel connection composed of two semiconductor switches, the semiconductor switches inside the part-modules should all be designed for only half the current-carrying capacity. Thus all semiconductor switches of the part-module can be embodied as structurally identical.

In addition, the semiconductor switches of both the part-modules should be controlled identically. Thus for the submodule that is constructed from two part-modules only one trigger circuit is used for the six semiconductor switches, the control signals of which are distributed in parallel to both the part-modules, such that they are synchronously controlled.

A network node should be understood as a branch within an electronic circuit, also referred to as an electronic network. Thus at least three current paths converge at a network node.

The properties and advantages can be summarized as follows. Thanks to the symmetrical structure, in particular when two or more part-modules are used, there are two or more parallel current paths for the current through the submodule that are important for the present invention. The number of parallel current paths results from the number of parallel part-modules. In this case the first capacitor and the second capacitor as well as the third capacitor and the fourth capacitor each form a parallel connection that is decoupled via diodes. This results in high availability, since even if a semiconductor and/or a capacitor fails the submodule can continue to be operated. Compared to increasing the number of modules to achieve a comparable redundancy simultaneously with the provision of a comparable voltage across different switching states, substantially fewer semiconductors are required. At the same time, thanks to the parallel connection of the capacitors the capacity of the individual capacitors can be dimensioned to be smaller, in particular half as large. In the event of damage, this reduces the potential for destruction emanating from the capacitors. In other words, faults in a capacitor, as already described, can be controlled more easily, since the amounts of stored energy present are substantially smaller. Because fewer semiconductors are employed the proposed structure is additionally considerably easier and more cost-effective to manufacture. In addition, the likelihood of failure decreases considerably because fewer semiconductors are used. This results in high availability of the submodule and of the multilevel converter constructed therefrom.

BRIEF DESCRIPTION OF THE DRAWING

The invention is described and explained in greater detail below using the exemplary embodiments represented in the figures, in which:

FIG. 3 shows switching states of the submodule.

DETAILED DESCRIPTION OF PREFERRED EMBODIMENTS

Figure 1:
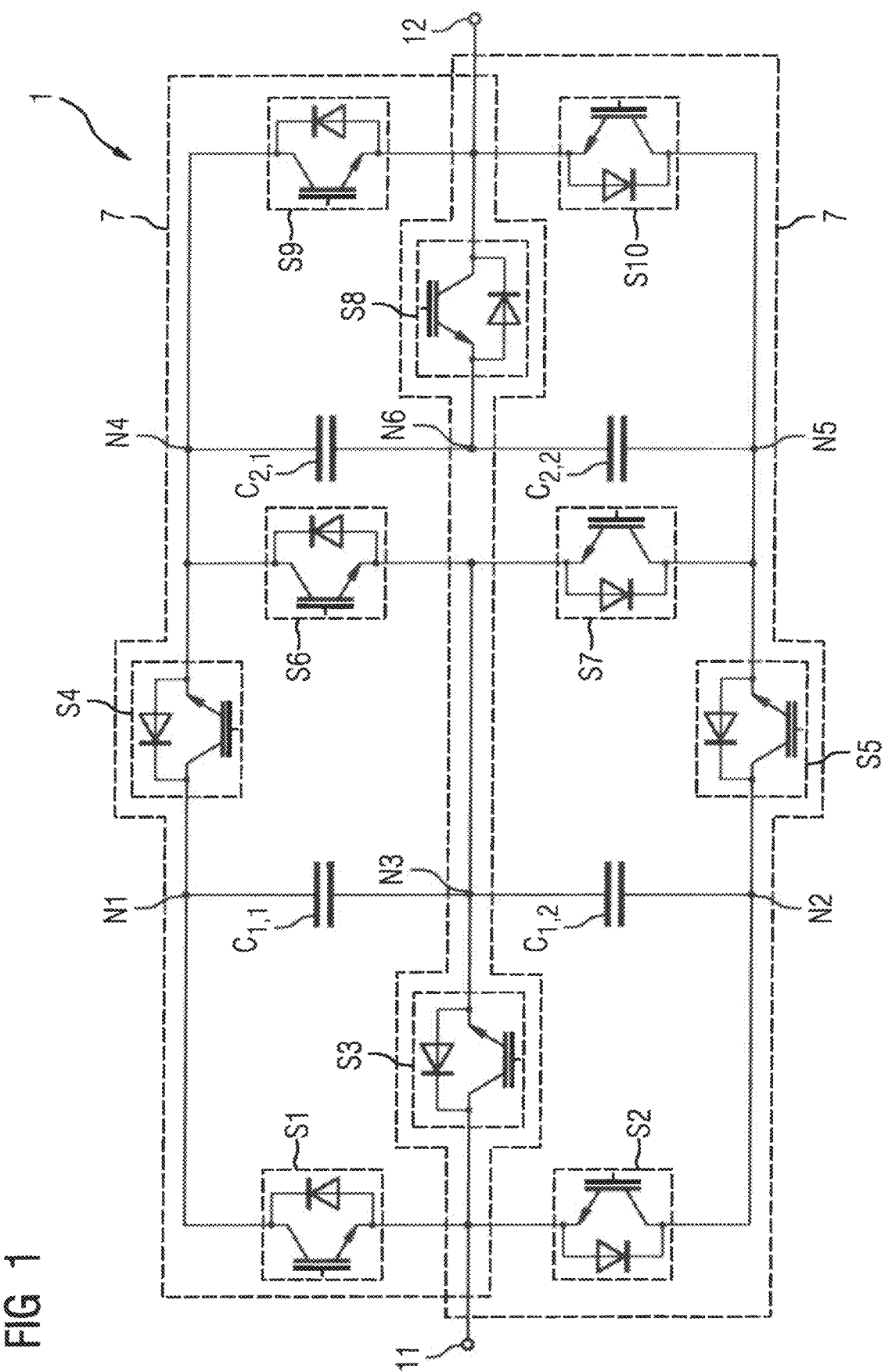
FIG. 1 shows the structure of the inventive submodule.

FIG. 1 shows an exemplary embodiment of an inventive submodule 1. In each case a component is arranged between the individual network nodes N1 . . . N6. In this case the individual components are arranged directly between the network nodes N1 . . . N6 and connect the respective two network nodes to one another or one of the network nodes N1 . . . N6 to one of the terminals 11, 12. The voltage between the terminals 11, 12 of the submodule 1 is referred to as $U_{SM}$. In this case the third semiconductor switch S3 and the eighth semiconductor switch S8 are advantageously each dimensioned for the full current-carrying capacity of the submodule 1. The other semiconductor switches S1, S2, S4, S5, S6, S7, S9, S10 should each be designed for half the current-carrying capacity.

It should be recognized that the structure of the submodule 1 runs mirror-symmetrically to an axis which is formed by the terminals 11, 12 of the submodule 1. This means it is possible to construct the submodule 1 from two identical part-modules 7, which in each case are connected to one another at the terminals 11, 12, at the third network node N3 and the sixth network node N6. A part-module in this case comprises the terminals 11, 12, the first, third, fourth, sixth, eighth and ninth semiconductor switch S1, S3, S4, S6, S8, S9, the first and the third capacitor $C_{1,1}$, $C_{2,1}$ and the first, third, fourth and the sixth network node N1, N3, N4, N6. To form a submodule 1 from two structurally identical part-modules 7, the two structurally identical part-modules 7 are each electrically conductively connected to one another at the terminals 11, 12, the third network nodes N3 and the sixth network nodes N6.

In this case the third semiconductor switch S3 and the eighth semiconductor switch S8 can likewise be designed for half the current-carrying capacity of the submodule 1. The full current-carrying capacity then results from the parallel connection because the submodule 1 is constructed from both the part-modules 7. This means all semiconductor switches inside the part-module 7 can be designed identically, in particular in respect of the current-carrying capacity. This increases the number of common parts and increases the ease of maintenance of the submodule 1. Thanks to the large quantity of common parts for the semiconductor switches S1 . . . S10 the manufacture of the submodule becomes particularly cost-effective and reliable.

Figure 2:
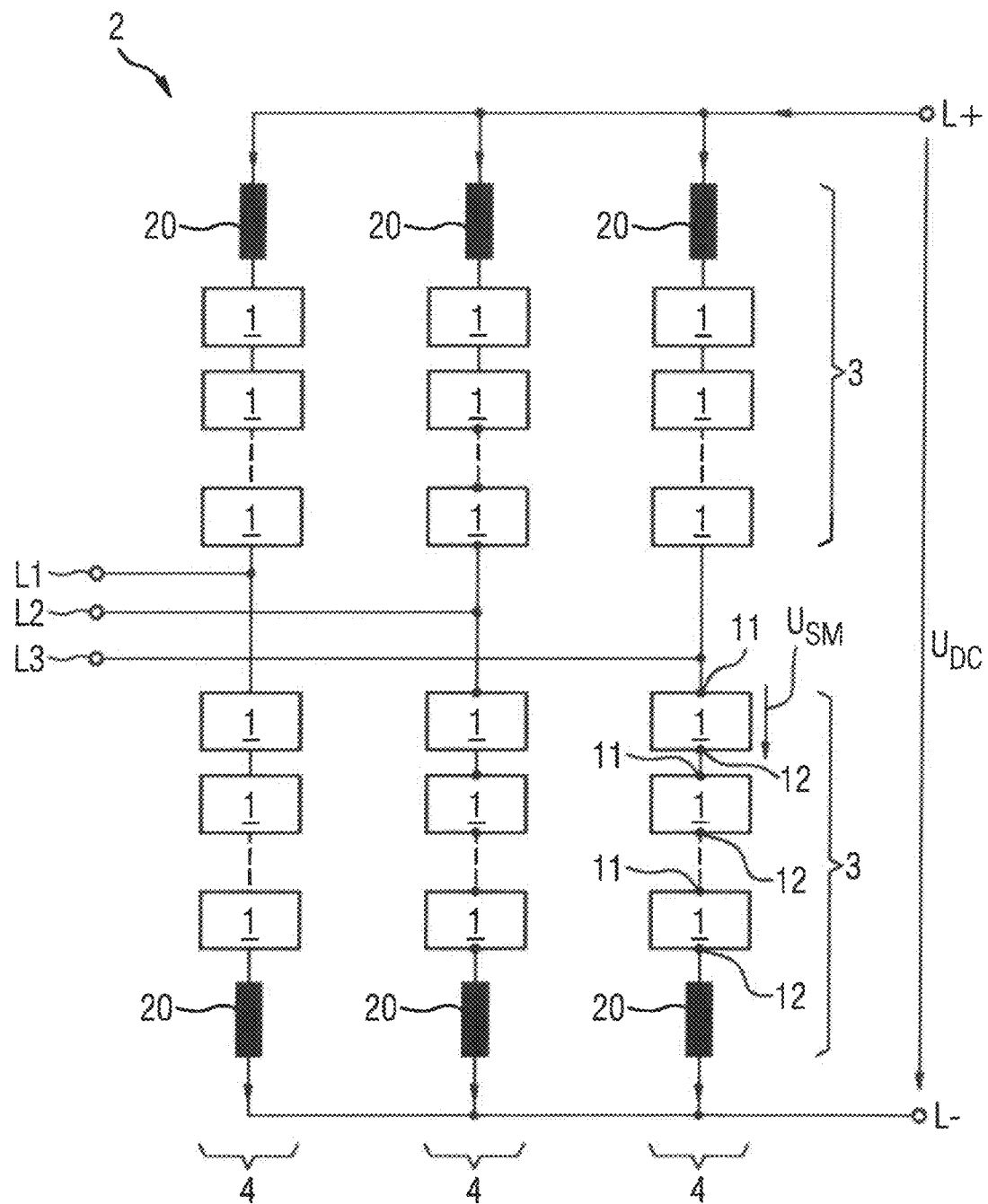
FIG. 2 shows the structure of the modular multilevel converter.

FIG. 2 shows an exemplary embodiment of a modular multilevel converter 2, which is constructed from the proposed submodules 1. To avoid repetitions, reference is made to the description for FIG. 1 and to the reference characters introduced there. These submodules 1 are arranged in series in their terminals 11, 12, which for the sake of clarity are represented in just one converter arm 3, and form the converter arm 3. Two converter arms 3 arranged in series form the converter phase 4. The connection point of the converter arms 3 forms the phase connection L1, L2, L3. The converter phases 4 are arranged between the intermediate circuit connections L+, L−. To improve regulation and/or control, it has proved to be advantageous to supplement the serial connection of the converter arms 3 with inductors 20, which are arranged in series between the converter arm 3 and the respective intermediate circuit connection L+, L−. In each case the module voltage $U_{SM}$ resulting from the switching states of the semiconductor switches S1 . . . S10 is present at the individual submodules 1.

The present exemplary embodiment is designed as a three-phase modular multilevel converter 2.

FIG. 3 shows the possible switching states of the semiconductor switches S1 . . . S10 and the resultant voltage $U_{SM}$ between the terminals 11, 12 of the submodule 1. To avoid repetitions reference is made to the description for FIGS. 1 and 2 and to the reference characters introduced there. In this case the first and the second semiconductor switches S1, S2, the fourth and the fifth semiconductor switches S4, S5, the sixth and the seventh semiconductor switches S6, S7, the ninth and the tenth semiconductor switches S9, S10 are each controlled identically, i.e. switched on, which is characterized in the table by a 1, or switched off, which is characterized by a 0. As a result it becomes clear that only one control unit is required to implement the submodule 1 composed of two part-modules 7, since the semiconductor switches arranged in a mirror image always assume the identical switching state.

In the preferred switching states, which are numbered consecutively from 1 to 6, the submodule voltage $U_{SM}$ arises regardless of the direction of current flow of the current through the submodule 1. Only the state BLOCK, in which all semiconductor switches S1 . . . S10 are switched off, delivers different submodule voltages $U_{SM}$ depending on the direction of current flow, so that this state is preferably not used for controlling the submodule 1.

In summary, the invention relates to a submodule for a modular multilevel converter having:
ten semiconductor switches that can be switched off
four capacitors
six network nodes
two terminals,
wherein the components are arranged such that when the semiconductor switches that can be switched off are controlled, different voltages are generated between the terminals of the submodule. In this case the behavior of the converter and of the submodule can be substantially improved in the event of a fault.

The invention claimed is:

1. A submodule for a modular multilevel power converter, comprising:
a first semiconductor switch, a fourth semiconductor switch and a ninth semiconductor switch forming a first series connection between a first terminal and a second terminal of the submodule, with the first semiconductor switch directly connected in a forward direction to the fourth semiconductor switch at a first network node, and with the fourth semiconductor switch directly connected in the forward direction to the ninth semiconductor switch at a fourth network node, and the ninth semiconductor switch directly connected in the forward direction to the second terminal,
a second semiconductor switch, a fifth semiconductor switch and a tenth semiconductor switch forming a second series connection between the first terminal and the second terminal and connected in parallel with the first series connection, with the second semiconductor switch directly connected in a reverse direction to the fifth semiconductor switch at a second network node, and with the fifth semiconductor switch directly connected in the forward direction to the tenth semiconductor switch at a fifth network node, and the tenth semiconductor switch directly connected in the forward direction to the second terminal,
a third semiconductor switch directly connected in the forward direction between the first terminal and a third network node,
a sixth semiconductor switch directly connected in the forward direction between the fourth network node and the third network node,
a seventh semiconductor switch directly connected in the forward direction between the fifth network node and the third network node,
an eighth semiconductor switch directly connected in the reverse direction between a sixth network node and the second terminal,
a first capacitor directly connected between the first network node and the third network node,
a second capacitor directly connected between the second network node and the third network node,
a third capacitor directly connected between the fourth network node and the sixth network node, and
a fourth capacitor directly connected between the fifth network node and the sixth network node.

2. The submodule of claim 1, wherein the first, second, third, fourth, fifth, sixth, seventh, eighth, ninth and tenth semiconductor switches are constructed so as to be able to conduct as well as disconnect current flow in the forward direction, while only being able to conduct current flow in the reverse direction.

3. The submodule of claim 1, wherein the first series connection is constructed identically to the second series connection.

4. A modular multilevel power converter, comprising a plurality of submodules, each of the plurality of the submodules constructed as set forth in claim 1, with at least two of the plurality of the submodules connected in series to form a converter arm of the modular multilevel power converter and two converter arms connected in series at a connection point forming a converter phase, wherein the connection point forms a phase connector of the modular multilevel power converter.

5. The modular multilevel power converter of claim 4, wherein an end of the converter arm, which is remote from the phase connector, forms an intermediate circuit connector of the multilevel power converter.

6. A method for operating a submodule constructed as set forth in claim 1, comprising generating different voltages between the first terminal and the second terminal by switching operations of the first, second, third, fourth, fifth, sixth, seventh, eighth, ninth and tenth semiconductor switches.

7. The submodule of claim 1 constructed from two part-modules, wherein a first of the two part modules comprises the first, third, fourth, sixth, eighth and ninth semiconductor switches, the first and the third capacitor and the first, third, fourth and the sixth network nodes, and wherein a second of the two part modules comprises the second, third, fifth, seventh, eighth and tenth semiconductor switches, the second and the fourth capacitor and the second, third, fifth and the sixth network nodes.

* * * * *